April 2, 1929.   F. C. REEDER   1,707,926
FLOAT CONTROLLED DEVICE
Filed Dec. 31, 1926   2 Sheets-Sheet 1
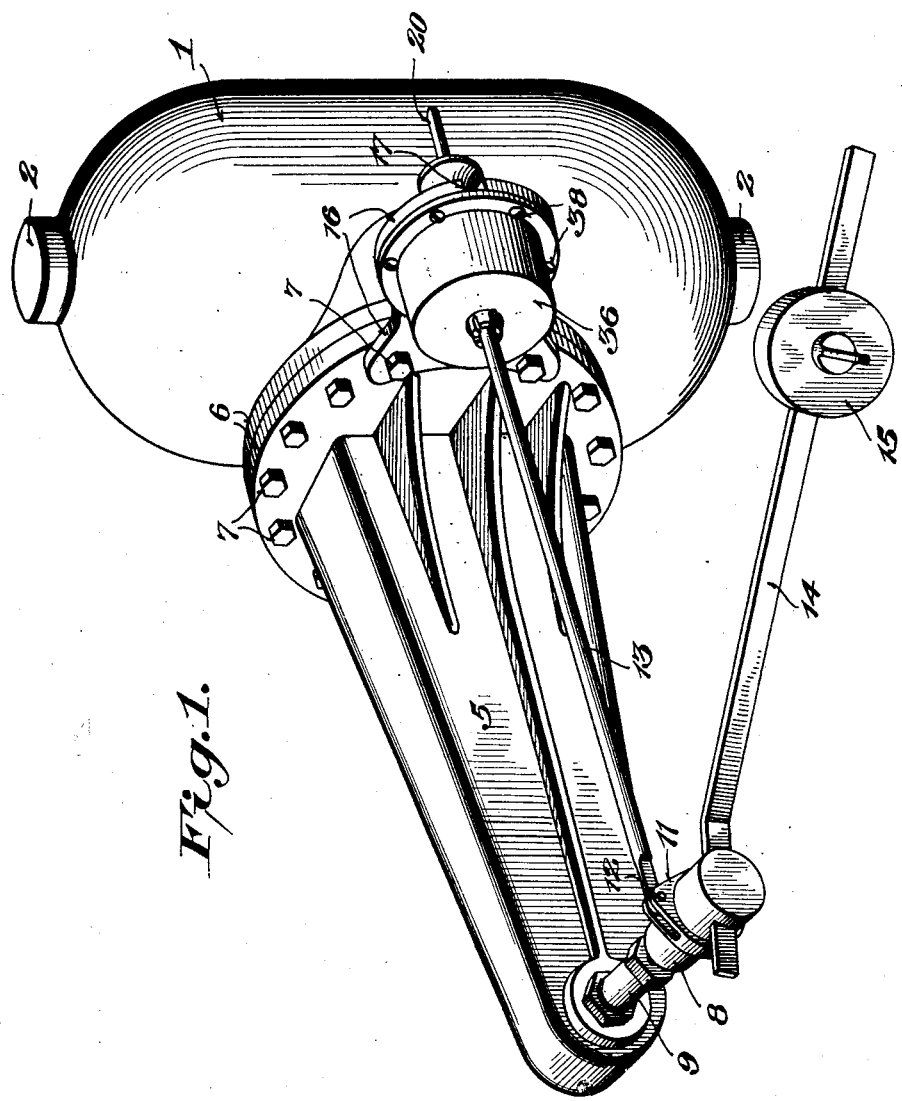

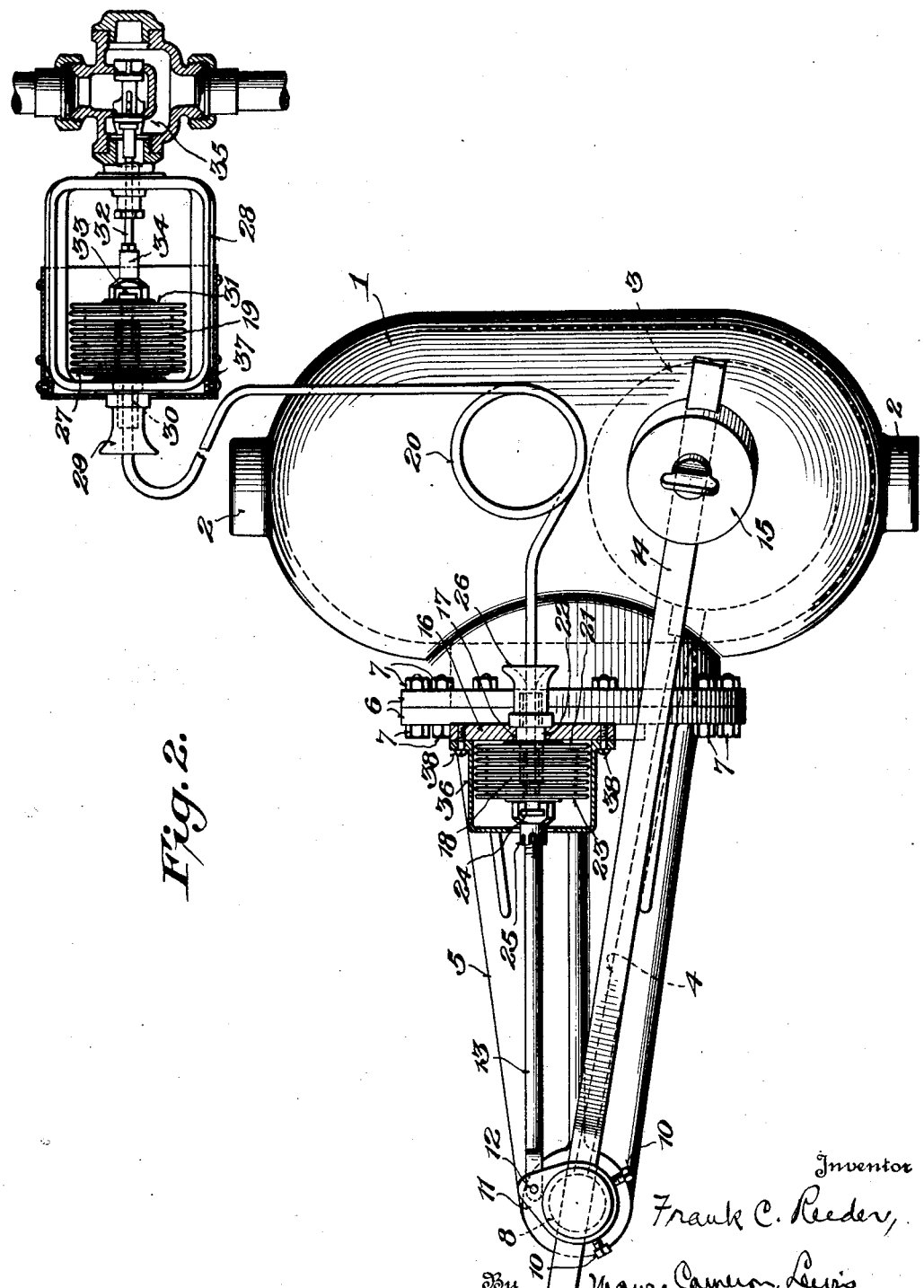

Patented Apr. 2, 1929.

1,707,926

UNITED STATES PATENT OFFICE.

FRANK C. REEDER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

FLOAT-CONTROLLED DEVICE.

Application filed December 31, 1926. Serial No. 158,361.

This invention relates to mechanism for transmitting motion from a float to an element to be controlled by the relative position of said float.

Various float controlled regulating devices have heretofore been suggested, and employed to a considerable extent, wherein the necessities or expediences of the installation have called for the location of the float at some distance from the element to be controlled thereby, and various forms of mechanical transmissions for connecting the float with the element to be controlled have been suggested and employed, but these mechanical transmissions have many disadvantages. If they are positive in their action they are subject to considerable wear, particularly at the joints or pivots, with a resulting lost motion that destroys accuracy or nicety of control; if they are not positive in their action, the control is rough and uncertain; they are frequently complex in construction and sometimes subject to ready derangement.

It is an object of this invention to provide a mechanism for transmitting motion from a float to an element to be controlled which is positive and certain in its action and free from lost motion, and which is relatively simple and rugged in construction.

Another object of this invention is to provide a mechanism for transmitting motion from a float to an element to be controlled which is flexible in character so as to permit its use in a wide variety of constructions wherein the location and distance of the element to be controlled with reference to the float may be varied within relatively wide limits.

Another object of this invention is to provide a device of the character described which includes a readily attachable and detachable transmission unit so that in the event of injury to the transmission device a substitute transmission unit may be readily installed in place of the injured unit, said unit being of a simple, light and compact construction which may be readily standardized, kept in stock, transported and installed without the use of skilled labor.

Other objects will appear as the description of the invention proceeds.

The invention is capable of receiving a variety of mechanical expressions, one of which has been shown on the accompanying drawings, but it is to be expressly understood that the drawings are for purposes of illustration only and are not to be construed as a definition of the limits of the invention, reference being had to the appended claims for that purpose.

Referring in details to the drawings, wherein the same reference characters are employed to designate corresponding parts, Fig. 1 is a perspective of an embodiment of the present invention, and Fig. 2 is an elevation, partly in section, of the embodiment of Fig. 1.

In the form shown, a float box 1 of any suitable size, shape, construction and material is provided with suitable inlet and outlet openings 2 so that said float box may be suitably connected with the source or container of liquid the level of which is to be controlled. Within said float box 1 is a float 3 of any suitable size, shape, construction and material, and shown as a spherical shell suitably attached to a float arm or lever 4 (shown in dotted lines in Fig. 2). Said float arm extends from said float 3 through an opening in the lateral wall of the float box 1, and is shown as housed in an extension 5 of the float box, which extension is suitably attached to the float box as by the flanges 6 and bolts 7. The outer end of the float rod or lever 4 is attached in any suitable way to a shaft or spindle 8 which has bearing in the outer extremity of the extension 5 and extends to the outside of said extension through a stuffing box 9. Mounted on said spindle 8 and suitably attached thereto, as by set screws 10, so as to prevent relative rotation, is a crank 11 to which is pivotally connected at 12 a thrust rod 13. If desired, the spindle 8 may also be provided with an arm 14 projecting through an aperture in the outer end thereof and suitably retained therein, said arm 14 carrying an adjustable weight 15 whereby the float and its arm may be counterbalanced or a torque imparted to the spindle 8 for exerting an initial thrust on the rod 13.

Mounted on the float box or its extension, and preferably retained in position by some of the bolts 7, is a bracket 16 having a slot 17 extending inwardly from the periphery thereof. Mounted on said bracket 16 is one element of a fluid transmission device composed of a pair of expansible and collapsible vessels 18 and 19 connected by a long flexible tube 20, said vessels 18 and 19 with their intermediate connecting tube 20 constituting a unit which is in open communcation and filled with a noncompressible liquid, such as oil, for example. In the form shown, each of said expansible and collapsible vessels 18 and 19 is composed of a deeply corrugated, highly flexible lateral wall, preferably of resilient metal, suitably attached, as by soldering, to end walls, one of which is designed to be stationary and the other of which is designed to be movable. The stationary end wall 21 of the vessel 18 has a tubular boss 22 through which the tube 20 communicates with the interior of said vessel and in which said tube is hermetically sealed in any suitable way. The movable end wall 23 of said vessel 18 is provided with means for ready attachment to and detachment from the thrust rod 13, being shown as provided with a T head 24 for engagement in a T slot in the end of the thrust rod 13 or in a member 25 suitably secured to the end of said rod. Slot 17 is designed to receive the tubular boss 22 and said boss may be retained in said slot in any suitable way, as by clamping the stationary end wall 21 to the bracket 16 by a tubular nut 26 threaded onto the end of said boss, said nut being shown as provided with a conically flared outer end to prevent sharp bends in the flexible tube 20. The tube 20 may be of any suitable type and construction but is preferably provided with a metallic sheath.

The stationary end wall 27 of the vessel 19 is fixedly clamped in position, in any suitable way, in a slot in a frame 28 associated with the element to be controlled. In the form shown, a tubular nut 29 is provided for coaction with the threaded extremity of the tubular boss 30 through which the end of the tube 20 communicates with the interior of the vessel 19 and in which said tube end is hermetically sealed. Nut 29 is also preferably provided with a flared extremity to prevent sharp bends in the tube 20. The movable end wall 31 of said vessel 19 is provided with suitable means for attachment to a stem or rod 32 extending to the element to be controlled. In the form shown, said movable end wall 31 has a T head 33 for coaction with a T slot in the member 34 suitably mounted on the rod 32. Rod 32 extends to the element to be controlled, shown diagrammatically as a valve mechanism 35.

If desired, the expansible and collapsible vessels 18 and 19 may be protected after they are mounted in position by means of light metal covers 36 and 37 respectively, and and mounted in position in any suitable way as by screws 38 in the case of the cover 36.

The expansible and collapsible vessels 18 and 19 with their communicating tube 20 constitute a readily attachable and detachable unit because the vessel 18 may be readily inserted into or withdrawn from the slot 17 in the bracket 16 when the nut 26 is loosened, and the vessel 19 may be correspondingly inserted into or withdrawn from a corresponding slot in the frame 28 when the nut 29 is loosened. The vessels 18 and 19 are connected with or disconnected from the rods 13 and 32 respectively, by engaging or disengaging the T heads 24 and 33 with or from the T slots in said rods, at the time said vessels are mounted in position or withdrawn therefrom. Said transmission unit may be readily standardized and is both compact and light in weight so that it may be readily kept in stock and easily transported. Owing to the facility of its connection and disconnection, an injured unit may be withdrawn and a new unit installed by the usual attendant without the use of special tools or the requirement of special skill.

In the form shown, the rising of the float 3 will exert a pull on the rod 13 and a consequent opening of the valve 35 by reason of the force transmitted through the fluid column within the vessels 18 and 19 and connecting tube 20, while a lowering of the float will for similar reasons cause a closing of the valve. By moving the crank arm 11 through 180° or by reversing the valve mechanism the valve may be closed as the float rises and opened as the float lowers. While a valve has been shown as the element to be controlled, it is to be expressly understood that such valve has been selected as typical of any suitable element to be controlled by the movement of the float.

It will therefore be perceived that a simple and rugged mechanism for transmitting motion from a float to an element to be controlled has been provided, and this transmission is positive in action and little subject to wear and lost motion. It is also flexible in character because, owing to the flexible tube 20 which may be made of any suitable length, the element to be controlled can be located in any desired relation to the float and at any desired distance from the float up to the length of the tube 20. Also owing to the readily attachable and detachable character of the transmission unit employed, the transmission mechanism may be readily repaired in the event of injury thereto without dismantling either the float tank or the element to be controlled. Thereby replacements can be made without discontinuing the operation of the apparatus as has heretofore been necessary when the level of the liquid must be lowered in order to open up the float tank or the fluid under control must be shut off in order to open up the valve mechanism.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, without departing from the spirit of this invention. Reference is therefore to be had to the claims hereto appended for a definition of the limits of the invention.

What is claimed is:

1. In a float-controlled mechanism, in combination with a float and float actuated member and an element to be controlled therefrom, a readily attachable and detachable fluid-transmission unit interposed between and attached to said float actuated member and said element.

2. In a float-controlled mechanism, in combination with a float and float-actuated member and an element to be controlled therefrom, a readily mountable and demountable transmission unit interposed between said float-actuated member and said element and comprising a flexible member permitting any desired orientation and spacing of the float and element and means for readily connecting said unit with and disconnecting it from said float-actuated member and said element.

3. In a float-controlled mechanism, in combination with a float and float actuated member and an element to be controlled therefrom, a readily mountable and demountable fluid transmission unit interposed between said float actuated member and said element and composed of a pair communicating expansible and collapsible vessels charged with an incompressible fluid, and means for readily connecting said vessels to and disconnecting them from said float actuated member and said element, respectively.

4. In a float-controlled mechanism, in combination with a float and float actuated member and an element to be controlled therefrom, a readily mountable and demountable fluid transmission unit interposed between said float actuated member and said element, said transmission unit comprising a pair of expansible and collapsible vessels communicating through a long flexible tube and charged with an incompressible liquid, and means for readily connecting said transmission unit to and disconnecting it from said float actuated member and said element.

5. In a float-controlled mechanism, in combination with a float and an element to be controlled therefrom, a rotary spindle to which said float is connected, a member actuated by the rotation of said spindle, and a fluid transmission unit interposed between said member and said element.

6. In a float-controlled mechanism, in combination with a float and an element to be controlled therefrom, a rotary spindle to which said float is connected, a member actuated by the rotation of said spindle, and a readily attachable and detachable transmission unit attached to said member and said element, respectively and comprising a flexible member enabling the relative location and separation of the float and element to be varied at will without affecting the control of the element by the float.

7. In a float-controlled mechanism, in combination with a float and an element to be controlled therefrom, a rotary spindle to which said float is connected, a member actuated by the rotation of said spindle, and a fluid transmission unit interposed between said member and said element, said unit comprising communicating expansible and collapsible vessels charged with incompressible liquid and readily connectible with and disconnectible from said member and said element, respectively.

8. In a float-controlled mechanism, in combination with a float and an element to be controlled therefrom, a rotary spindle to which said float is connected, a member actuated by said spindle, and a fluid transmission unit interposed between and readily attachable to and detachable from said member and said element, said unit comprising readily mountable and demountable expansible and collapsible vessels communicating through a long flexible tube and charged with an incompressible liquid.

9. In a float-controlled mechanism, in combination with a float and float actuated member and an element to be controlled therefrom, a housing for the float, a frame adjacent the element to be controlled, a fluid-transmission unit, and readily detachable means for mounting said unit on said housing and said frame in operative connection with said float actuated member and said element.

10. In a float-controlled mechanism, in combination with a float and float actuated member and an element to be controlled therefrom, a housing for the float, a frame adjacent the element to be controlled, a readily mountable and demountable transmission unit, and means detachably mounting said unit on said housing and said frame in operative connection with said float actuated member and said element.

11. In a float-controlled mechanism, in combination with a float and float actuated member and an element to be controlled therefrom, a housing for the float, a frame adjacent the element to be controlled, a fluid-transmission unit comprising communicating expansible and collapsible vessels charged with an incompressible fluid, and means for detachably mounting said vessels on said housing and said frame, respectively, in operative connection with said float actuated member and said element.

12. In a float-controlled mechanism, in combination with a float and float actuated member and an element to be controlled therefrom, a housing for the float, a frame adjacent the element to be controlled, a fluid-transmission unit comprising a pair of expansible and collapsible vessels communicating through a long flexible tube, and means for detachably mounting said vessels on said housing and said frame, respectively, in operative connection with said float actuated member and said element.

13. In a float-controlled mechanism, in combination with a float and an element to be controlled therefrom, a housing for the float, a frame adjacent the element to be controlled, a fluid-transmission unit comprising a pair of expansible and collapsible vessels communicating through a flexible tube, means for detachably mounting said vessels on said housing and said frame respectively, and connections between said vessels and said float and element respectively, completed by the mounting of said vessels on said housing and frame.

14. In a float-controlled mechanism, in combination with a float and an element to be controlled therefrom, a rotary spindle to which said float is connected, a member actuated by the rotation of said spindle, a readily attachable and detachable fluid-transmission unit attached to said member and said element respectively, and means cooperating with said spindle for imposing an initial load on said transmission unit.

15. In a float-controlled mechanism, in combination with a float and an element to be controlled therefrom, a rotary spindle to which said float is connected, a member actuated by the rotation of said spindle, a readily attachable and detachable fluid-transmission unit comprising expansible and collapsible vessels communicating through a flexible tube attached to said member and said element, respectively, and means cooperating with said spindle for imposing an initial load on said transmission unit.

In testimony whereof I have signed this specification.

FRANK C. REEDER.